United States Patent
Matsuno et al.

(10) Patent No.: US 6,392,535 B1
(45) Date of Patent: *May 21, 2002

(54) VEHICLE DYNAMIC CONTROL SYSTEM

(75) Inventors: Koji Matsuno; Munenori Matsuura, both of Tokyo (JP)

(73) Assignee: Fuji Jukogyo Kabushiki Kaisha, Tokyo-To (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/722,399

(22) Filed: Nov. 28, 2000

Related U.S. Application Data (63) Continuation of application No. 09/266,627, filed on Mar. 11, 1999, now Pat. No. 6,188,316.

(30) Foreign Application Priority Data

Mar. 12, 1998 (JP) ............................................. 10-61575

(51) Int. Cl.[7] ................................................ B60Q 1/00
(52) U.S. Cl. .......................... 340/441; 340/425; 701/1; 701/23; 701/65; 701/70; 701/93; 701/200; 701/201
(58) Field of Search ............................. 340/441, 425.5; 701/1, 23, 65, 70, 200, 201, 93

(56) References Cited

U.S. PATENT DOCUMENTS

| | | |
|---|---|---|
| 5,315,295 A | 5/1994 | Fujii |
| 5,357,798 A | 10/1994 | Weinzerl et al. |
| 5,748,476 A | 5/1998 | Sekine et al. |
| 5,752,214 A | 5/1998 | Minowa et al. |
| 5,857,754 A | 1/1999 | Fukami et al. |
| 5,902,345 A | 5/1999 | Minowa et al. |
| 5,978,724 A | 11/1999 | Sekine |
| 5,978,731 A | 11/1999 | Matsuda |
| 6,188,316 B1 * | 2/2001 | Matsuno et al. ............ 340/441 |

FOREIGN PATENT DOCUMENTS

| | | |
|---|---|---|
| DE | 196 21 085 A1 | 11/1996 |
| DE | 197 03 668 A1 | 8/1997 |
| JP | 8-194886 | 7/1996 |

* cited by examiner

*Primary Examiner*—Julie Lieu
(74) *Attorney, Agent, or Firm*—Smith, Gambrell & Russell, LLP

(57) ABSTRACT

A vehicle dynamic control system includes: (a) a running condition detecting system for detecting running conditions of a vehicle; (b) a road data detecting system for detecting road data relating to a road in front of the vehicle; (c) a permissible speed calculating system for calculating a permissible speed for passing through a curve based on the running conditions and the road data; (d) an equivalent linear distance calculating system for calculating an equivalent linear distance as a distance for performing a deceleration operation by shortening a distance from a point of operation to the curve in front of the vehicle based on a permissible deceleration at a winding part of the road and a curvature of the winding part between the point of operation and the curve so as to consider a permissible deceleration applicable at the winding part of the road; (e) a passing judgement system for judging a possibility of the vehicle passing through the curve by a parameter based on at least the equivalent linear distance and the permissible speed; and (f) a warning and deceleration control system for activating at least one of a warning system or a decelerating system based on a judgement of the passing judgement system. The invention also relates to a method for controlling a vehicle using this system.

5 Claims, 8 Drawing Sheets

VEHICLE DYNAMIC CONTROL SYSTEM

This application is a continuation of U.S. application Ser. No. 09/266,627 filed Mar. 11, 1999, now U.S. Pat. No. 6,188,316.

BACKGROUND OF THE INVENTION

This invention relates to a vehicle dynamic control system which carries out warning and decelerating control in order to assist a vehicle in safely passing through a curve on a road in front of the vehicle.

Recently developed are several kinds of technology wherein road map data, provided from a navigator installed on a vehicle, are processed into road geometry data. Warning and decelerating controls are carried out after a judgement is made on the possibility of a vehicle passing through an approaching curve based on road data including the curvature of the curve and vehicle speed.

For example, Japanese Patent Laid-open No. 194886/1996 disclosed warning and vehicle speed control technology. Road data of a curve on a road are calculated based on road map data provided from a navigator. A permissible lateral acceleration allowable limit to enter into the curve and a foreseeable lateral acceleration at the entrance of the curve if the vehicle goes on at the present speed are calculated and compared. When the foreseeable lateral acceleration is larger than the permissible lateral acceleration, the present speed is judged as too high to enter into the curve, namely an over speed condition, and a warning and vehicle speed control are carried out.

When judging the possibility of passing through a curve, the approaching road to the curve is deemed to be a straight line and certain deceleration is applied to reduce an initial speed to a speed which is slow enough to allow the vehicle to safely pass through the curve.

Thinking about a case where the road to the objective curve is not a straight line, the judgement may not be made accurately by the calculation. In the case where the road is not a straight line, lateral acceleration occurs on the vehicle, resulting in forced reduction of deceleration based on a relation between longitudinal acceleration and lateral acceleration. Thus, an over speed judgement may be allowed by the system.

In order to eliminate the influence of the error, it may be a countermeasure to calculate permissible decelerations for all bends and then carry out the control. But as enormous calculations then would be required, processing speed becomes too slow for practical use.

SUMMARY OF THE INVENTION

The present invention provides a vehicle dynamic control system which can improve the accuracy of over speed judgement even in the case where a road leading to an objective curve is not a straight line, while minimizing the calculation load, during the process of making a judgement on whether present vehicle speed is an over speed or not after recognizing road geometry data of a curve on a road in front of the vehicle.

In order to achieve the aforementioned object, a vehicle dynamic control system according to the invention comprises a running condition detecting means for detecting running conditions of a vehicle, a road data detecting means for detecting road data of a road in front of the vehicle, a worth judging distance calculating means for calculating a worth judging distance from a point of operation to a curve on the road in front of the vehicle based on the road data, the worth judging distance being corrected and reduced according to curvatures of the road between the point of operation and the curve, a passing judgement means for judging the possibility of the vehicle passing through the curve based on the worth judging distance calculated by the worth judging distance calculating means, and a warning and deceleration control means for operating a warning means and activating at least one predetermined decelerating means according to the judgement of the passing judgement means.

In the vehicle dynamic control system according to the invention, the running condition detecting means detects vehicle running conditions, and the road data detecting means detects road data of the road in front of the vehicle. The worth judging distance calculating mean calculates the worth judging distance from the point of operation to the curve, correcting and reducing it according to curvatures of the road between the point of is operation and the curve. The passing judgement means judges the possibility of a vehicle passing through the curve according to the worth judging distance calculated by the worth judging distance calculating means. The warning and deceleration control means operates the warning means and activates at least one of the predetermined decelerating means according to the judgement.

The vehicle dynamic control system according to the invention may include a feature wherein the worth judging distance calculating means determines the worth judging distance, in terms of a permissible deceleration applicable at the winding part of the road in addition to the curvatures of the winding part of the road, the worth judging distance calculating means calculating the permissible deceleration by a friction circle relation between longitudinal and lateral accelerations. Thus, the concept of a friction circle is reflected in the control by the system so that precise control can be accomplished.

The vehicle dynamic control system according to the invention may further include a feature wherein the passing judgement means judges the possibility of a vehicle passing through the curve according to estimated running conditions based on running conditions at the point of operation and permissible running conditions based on running conditions for passing through the curve.

The vehicle dynamic control system according to the invention may further include features wherein the estimated running conditions include a standard deceleration applicable at the point of operation; the permissible running conditions include a permissible access speed for passing through the curve; the passing judgement means calculates a required deceleration to be applied until reaching the curve based on the permissible access speed, a vehicle speed at the point of operation and the worth judging distance; and the passing judgement means judges the possibility of passing through the curve by comparing the standard deceleration and the required deceleration in a predetermined manner. Namely, deceleration is a criterion for the judgement so that a precise control result can be obtained.

DETAILED DESCRIPTION OF THE PREFERRED EMBODIMENTS

Figure 2:
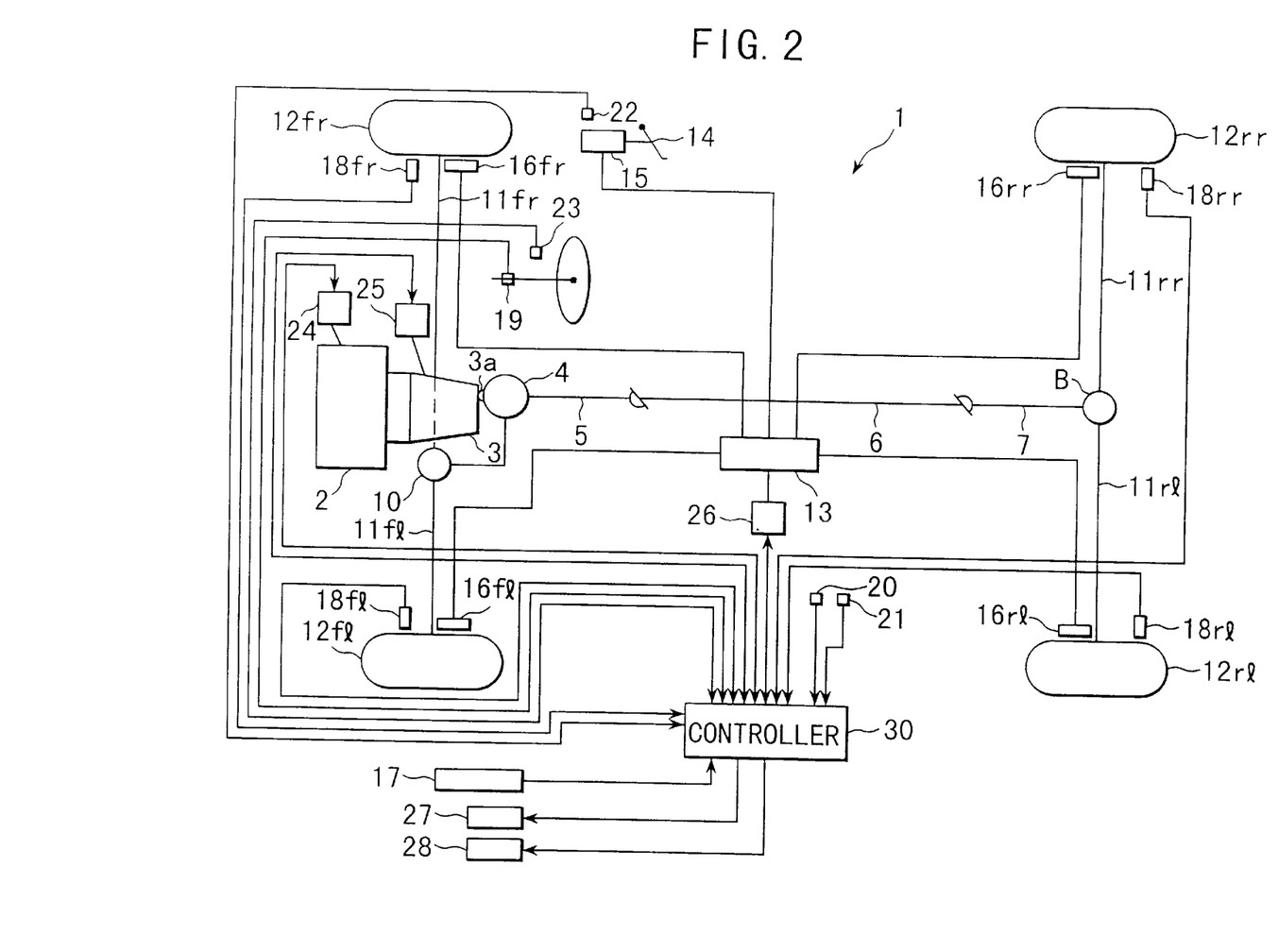
FIG. 2 is an illustration showing an outlined construction of a vehicle equipped with a vehicle dynamic control system.

A preferred embodiment of the present invention is described according to the accompanied drawings. Referring to FIG. 2, reference number 1 shows a 4-wheel driven vehicle having a center differential and an automatic transmission.

Driving force, generated by an engine 2 installed in front of the vehicle, is transmitted to the automatic transmission 3 (shown including a torque converter) located next to the engine 2, and further is transmitted to a center differential 4 through a transmission output shaft 3a. The driving force is delivered to a rear final reduction 8 through a rear drive shaft 5, a propeller shaft 6 and a drive pinion 7 in turn and also is delivered to a front final reduction 10 through a front drive shaft 9. The automatic transmission 3, the center differential 4 and the front final reduction 10 and so on are integrally accommodated in a case (not shown). The driving force inputted to the rear final reduction 8 is transmitted to a left rear wheel 12rl through a left rear drive shaft 11rl and also is transmitted to a right rear wheel 12rr through a right rear drive shaft 11rr. The driving force inputted to the front final reduction 10 is transmitted to a left front wheel 12fl through a left front drive shaft 11fl and also is transmitted to a right front wheel 12fr through a right front drive shaft 11fr.

A brake actuator 13 is hydraulically connected to a master cylinder is connected to a brake pedal 14 which is operated by a driver. When the driver operates the brake pedal 14, the master cylinder 15 pressurizes brake fluid and delivers the pressure through the brake actuator 13 to each of four wheel cylinders of the four wheels 12fl, 12fr, 12rl and 12rr. They are a front left wheel cylinder 16fl, a front right wheel cylinder 16fr, a rear left wheel cylinder 16rl and a rear right wheel cylinder 16rr.

The brake actuator 13, which is a hydraulic unit comprising a pressurizing device, a reducing valve and an intensifier, can apply brake pressure to the wheel cylinders 16fl, 16fr, 16rl and 16rr respectively, independently and controllably corresponding to inputted signals.

Figure 3:
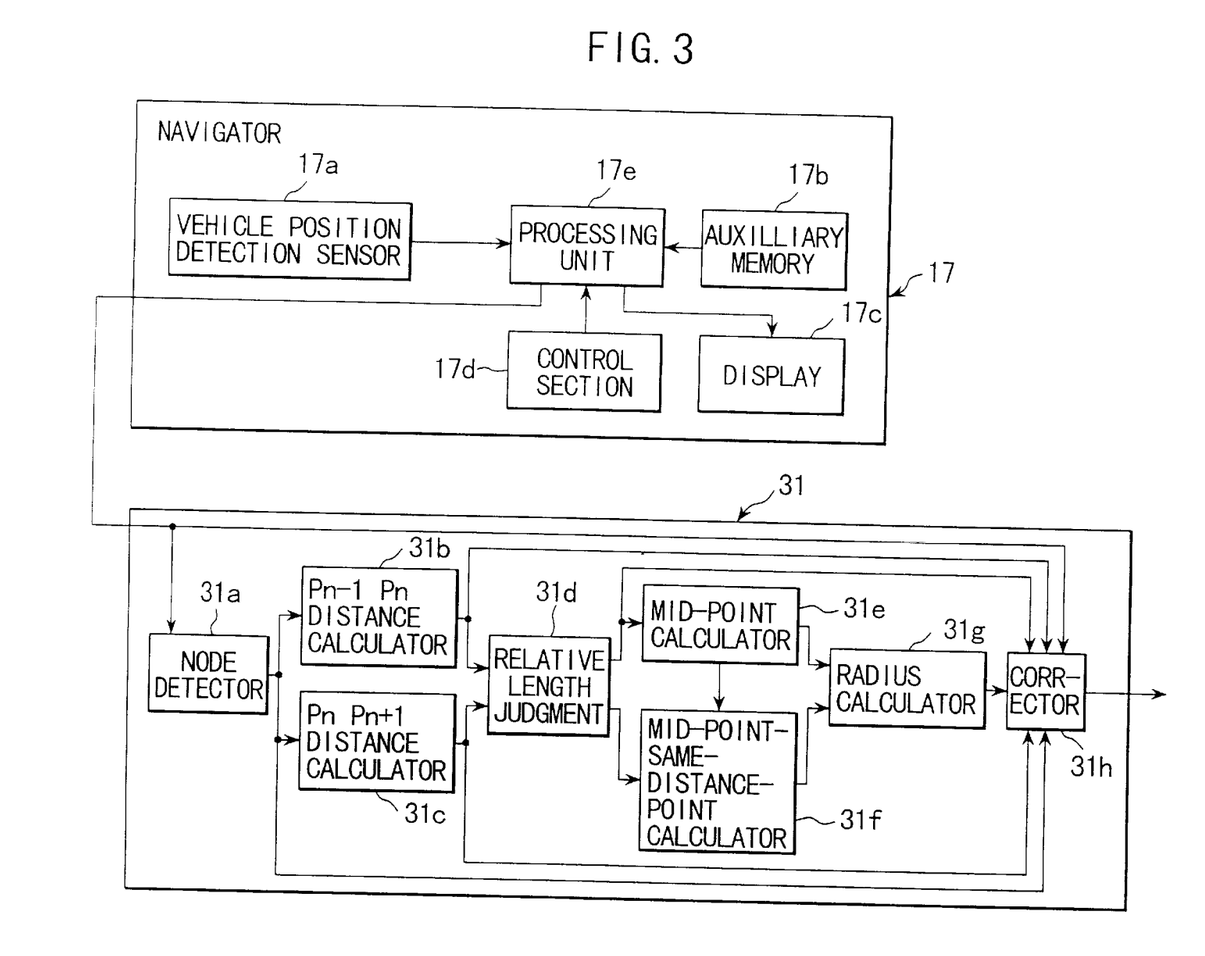
FIG. 3 is an illustration showing the calculation function to determine a radius of curvature by a road data calculator.

The vehicle 1 is equipped with a navigator 17. In general, as shown in FIG. 3, the navigator 17 consists mainly of a vehicle position detection sensor 17a, an auxiliary memory 17b, a display 17c, a control section 17d, and a processing unit 17e. The vehicle position detection sensor 17a gathers running information related to vehicle position. The sensor 17a consists mainly of a GPS (Global Positioning System) receiver to receive positioning signals from GPS satellites so as to determine the position of the vehicle, a geomagnetic sensor to detect the absolute running direction of the vehicle, and wheel speed sensors outputting pulse signals synchronized with wheel rotations.

The auxiliary memory 17b is a CD-ROM device, loading a CD ROM storing road map information including road data and topographical data. The CD-ROM stores road map information in a plurality of hierarchical levels in various scales and further stores road kind information such as motor ways, ordinary national roads and local roads, passage conditions of intersections and road widths. Road geometry data included in the road map information consist of node data with given intervals. Road width data are reduced in several rankings as shown below and stored:

W1=0: not investigated yet

W1=1: 0 m<W<3 m

W1=2: 3 m<W<5.5 m

W1=3: 5.5 m<W<13 m

W1=4: 13 m<W

The display 17c is a liquid crystal display which displays maps, the vehicle position (latitude, longitude and altitude), direction, the position of the vehicle on the map, and the optimum routing to a destination. A touch panel, which makes up the control section 17d, is integrated in the display 17c (liquid crystal display) to provide control functions, such as map scale change, and display switching functions to switch between a detailed place name display, area information display and route guidance display.

The processing unit 17e composes the vehicle running information inputted from the vehicle position detection sensor 17a and the road map information registered from the auxiliary memory 17b, while making map matching and other processing functions. The results are sent to the display 17c following an operating signal sent from the control section 17d, so as to display the present position of the vehicle, a map of the neighborhood, an optimum route to the destination and other information. The node data, the vehicle position and the road width information are outputted to a controller 30 to be mentioned later.

The controller 30 is connected to wheel speed sensors 18fl, 18fr, 18rl and 18rr for detecting speeds of the wheels 12fl, 12fr, 12rl and 12rr respectively, to a steering wheel angle sensor 19 for detecting steering wheel angle θH of the vehicle 1, a yaw rate sensor 20 for detecting yaw rate γ, a longitudinal acceleration sensor 21 for detecting longitudinal acceleration Gx, a master cylinder pressure sensor 22 for detecting master cylinder pressure and a turn signal switch 23 for detecting turn signal operation. The controller 30 receives these respective signals.

The controller 30 is also connected for communication to control units of respective decelerating means, i.e., to an engine control unit 24 for the engine 2, a transmission control unit 25 for the transmission 3 and a brake control unit 26 for the brake actuator 13.

The engine control unit 24, which is to carry out engine controls such as fuel injection control, ignition timing control, air fuel ratio control, charged pressure control and throttle opening control, provides the controller 30 with fuel cut information and throttle opening control information. The engine control unit 24 receives a signal for carrying out fuel cut, and then cuts fuel. When it receives a signal for carrying out complete throttle closing, the control unit 24 closes the throttle completely.

The transmission control unit 25, which is to carry out transmission controls such as gear speed change control, lock-up control and line pressure control, provides the controller 30 with information relating to shift lever position and gear position. When it receives a signal for carrying out shift down from the controller 30, the transmission control unit 25 carries out shift down.

The brake-control unit 26, which is to carry out antis locking brake control and automatic brake control in connection with the brake actuator 13, provides the controller 30 with information of the present braking situation. When it receives signals for braking or increasing braking force from the controller 30, the brake control unit 26 carries out braking or increases braking force, namely automatic braking.

Furthermore, the controller 30 is connected to a display 27 (for common use with the display 17c of the navigator 17) and a loudspeaker 28, which are provided in the compartment as warning means, so that warnings and alarms by voice, buzzer and display are carried out. The following are examples of warnings and alarms:

"Curve ahead. Speed down." when drawing the driver's attention to an over speed condition;
"Over speed. Deceleration is done." when carrying out forced deceleration control;
"Braked for speed down." when automatic braking is applied for forced deceleration control;
Blinking or lighting displays for informing of an over speed condition, forced deceleration control, automatic braking for forced deceleration control and so on.

The controller 30 determines a distance from the present position (point of operation) to the curve on the road in front of a vehicle as an equivalent linear distance by calculation based on data inputted from respective sensors and switches. The controller 30 also determines a standard deceleration which is applicable in the present running conditions and a permissible access speed for passing through the approaching curve based on the road geometry of the curve. Then a required deceleration to be applied until entering the curve is calculated based on the present speed, the equivalent linear distance and the permissible access speed. The required deceleration is compared with the standard deceleration in a predetermined manner, a decision is made with respect to warning and forced deceleration controls, and the controller 30 outputs instructions to the display 27, the loudspeaker 28, the engine control unit 24, the transmission control unit 25 and the brake control unit 26.

Figure 1:
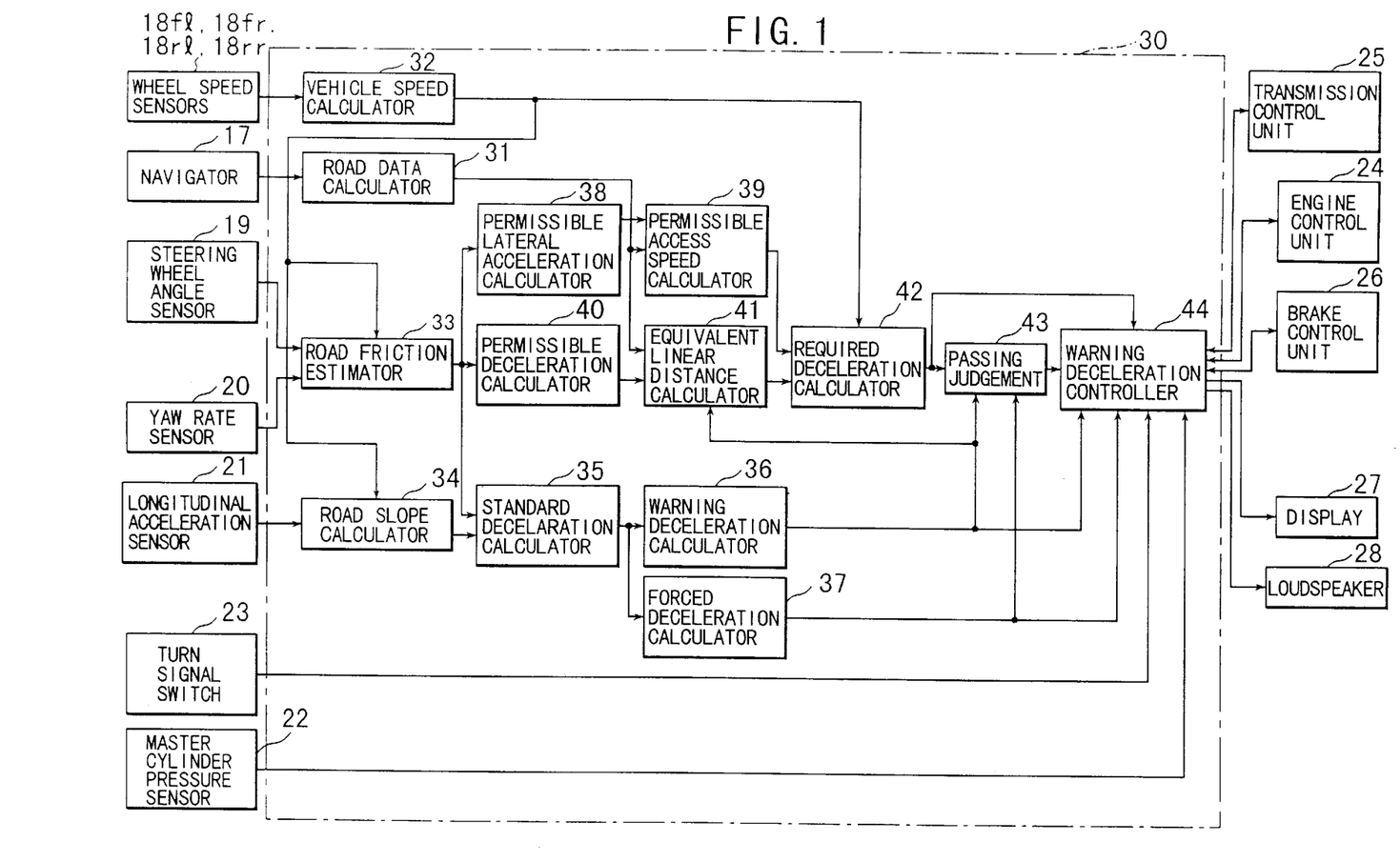
FIG. 1 is a functional block diagram showing a vehicle dynamic control system.

As illustrated in FIG. 1, the controller 30 mainly consists of the following devices: a road data calculator 31, a vehicle speed calculator 32, a road friction estimator 33, a road slope calculator 34, a standard deceleration calculator 35, a warning deceleration calculator 36, a forced deceleration calculator 37, a permissible lateral acceleration calculator 38, a permissible access speed calculator 39, a permissible deceleration calculator 40, an equivalent linear distance calculator 41, a required deceleration calculator 42, a passing judgement 43 and a warning deceleration controller 44.

The road data calculator 31 calculates road geometry data of the approaching road within a predetermined range, e.g., 300 m, based on inputted data from the navigator 17 and memorizes them. The road geometry data include position $(X_n, Y_n)$ of representative node Pn; distance Ln between node Pn−1 and node Pn; final radius of curvature Rn; curvature Rrn $(=1/R_n)$; curve range THn (curve depth) from curve starting point to ending point; curve center On; curve angle θn obtained from an angle formed by lines Pn−1 Pn and Pn Pn+1; distance between curve starting point Lsn (intersection point of the line Pn−1 Pn and a perpendicular line from the curve center On to the line Pn−1 Pn) and node Pn−1; and distance Lssn from the vehicle position to curve (link length). Then the road data calculator 31 determines which curve is an objective of the operation and transmits the curvature RRn to the permissible access speed calculator 39, and transmits the curvature RRn, the curve depth THn and the link length LSSn to the equivalent linear distance calculator 41. The road data detecting means consists of the navigator 17 and the road data calculator 31.

Figure 6:
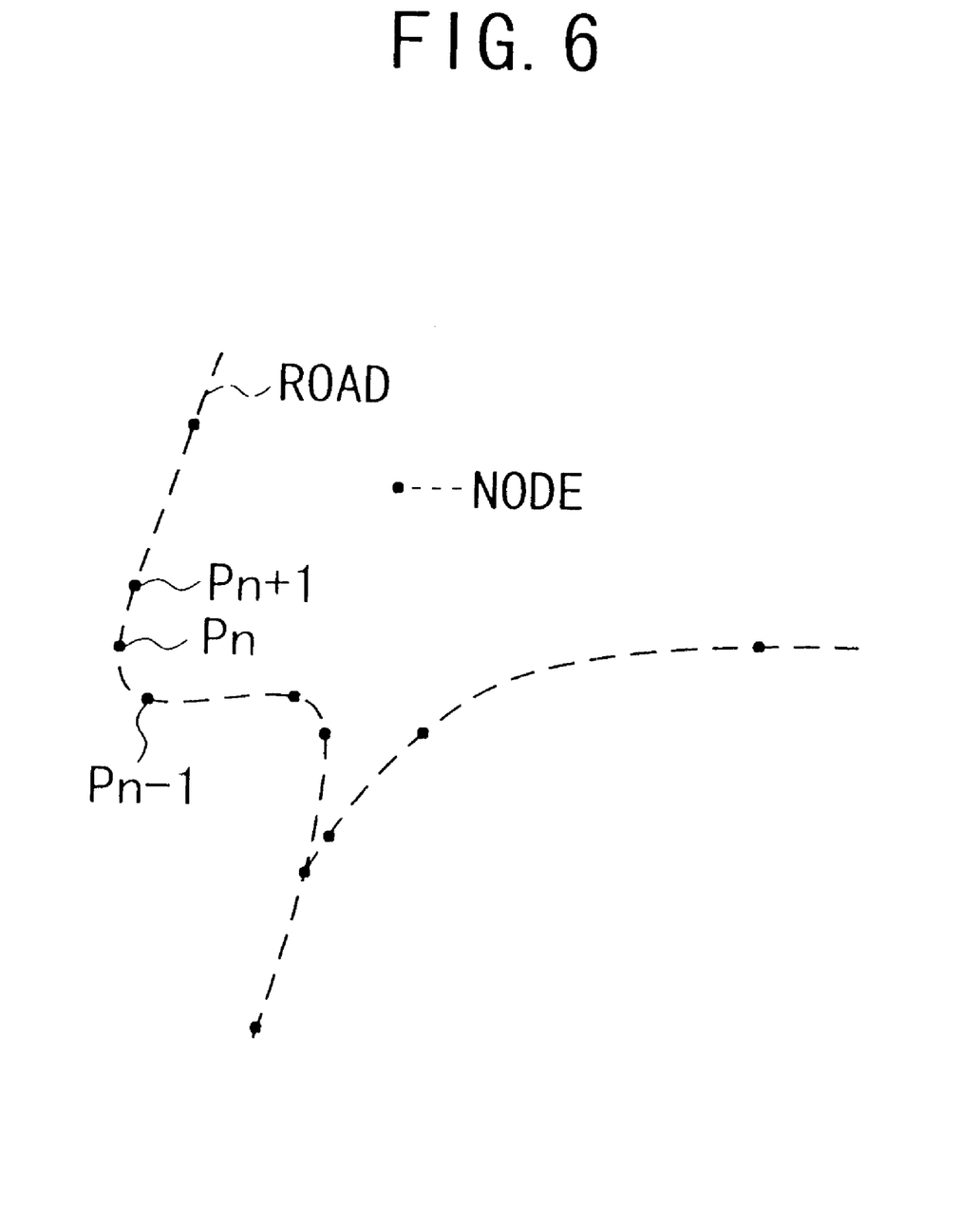
FIG. 6 is an illustration showing examples of data actually obtained from a navigator.

Detailed explanation on how to calculate radius of curvature Rn will follow. As shown in FIG. 3, the road data calculator 31 mainly consists of a node detector 31a, a Pn−1 Pn distance calculator 31b, a Pn Pn+1 distance calculator 31c, a relative length judgment 31d, a mid-point calculator 31e, a mid-point-same-distance-point calculator 31f, a radius calculator 31g, and a corrector 31h. As shown in FIG. 6, out of the node data inputted from the navigator 17, the node detector 31a registers three consecutive nodes in the traveling direction of the vehicle or on the road selected by the driver, and names the $1^{st}$ (first) node Pn-1, the $2^{nd}$ (second) node Pn and the $3^{rd}$ (third) node Pn+1, in turn from the closest. From the registered three nodes, the positional information of the $1^{st}$ (first) and $2^{nd}$ (second) nodes Pn−1 and Pn are outputted to the Pn−1 Pn distance calculator 31b, and the positional information of the $2^{nd}$ (second) and $3^{rd}$ (third) nodes, Pn and Pn+1 are outputted to the Pn Pn+1 distance calculator 31c. Positional data of Pn−1, Pn, and Pn+1 are $(X_{n-1}, Y_{n-1})$, $(X_n, Y_n)$, and $(X_{n+1}, Y_{n+1})$, respectively. Pn is the representative node of them. Curve data at points P1, P2, . . . , and Pn are calculated by node combinations of (P0, P1, P2), (P1, P2, P3), . . . , and (Pn−1, Pn, Pn+1), respectively.

The Pn−1 Pn distance calculator 31b calculates a linear distance from Pn−1 to Pn according to the positional information of Pn−1 and Pn inputted from the node detector 31a, and sends the distance datum to the relative length judgment 31d and the corrector 31h. The Pn Pn+1 distance calculator 31c calculates a linear distance from Pn to Pn+1 according to the positional information of Pn and Pn+1 inputted from the node detector 31a, and sends the distance datum to the relative length judgment 31d and the corrector 31h.

The relative length judgment 31d compares the linear distance from Pn−1 to Pn inputted from the Pn−1 Pn distance calculator 31b and the linear distance from Pn to Pn+1 inputted from the Pn Pn+1 distance calculator 31c, so as to judge relative length. Data (position, distance) of the shorter linear distance are sent to the mid-point calculator 31e and the corrector 31h, while data (position, distance) of the longer linear distance are sent to the mid-point-same-distance-point calculator 31f. When the comparison at the relative length judgment 31d shows an equal length for the both linear distances, either one can be used. It is set that the straight line connecting Pn−1 and Pn is regarded as the shorter straight line in this case. (Alternatively, it may be set that the straight line connecting Pn and Pn+1 is regarded as the shorter straight line).

An explanation will follow for the case when the straight line connecting Pn−1 Pn is shorter than the straight line connecting Pn and Pn+1. According to the data (position, distance) of the shorter straight line inputted from the relative length judgment 31d, the mid-point calculator 31e calculates half of the shorter linear distance and determines the mid point position on the shorter straight line. Here, the mid point on the shorter straight line connecting Pn−1 and Pn is named Pn−1, n of which coordinates are represented by $(X_{n-1,n}, Y_{n-1,n})$.

$$P_{n-1,n} = (X_{n-1,n}, Y_{n-1,n})$$

$$= ((X_{n-1} + X_n)/2, (Y_{n-1} + Y_n)/2)$$

The data calculated by the mid-point calculator 31e are sent to the mid-point-same-distance-point calculator 31f and the radius calculator 31g.

According to the data (position, distance) of the longer straight line inputted from the relative length judgment 31d and the half of the shorter linear distance inputted from the mid-point calculator 31e, the mid-point-same-distance-point calculator 31f determines a mid-point-same-distance-point on the longer straight line at the position in half the distance of the shorter straight line from the $2^{nd}$ (second) node Pn. Here, the mid-point-same-distance-point on the longer straight line connecting Pn and Pn+1 is named Pn,n+1, of which coordinates are represented by (Xn,n+1, Yn,n+1).

$$Pn,n+1=Pn+Pn\ Pn,n+1$$

$$=(Xn,Yn)+K2(Xn+1-Xn,\ Yn+1-Yn)$$

$$=(Xn,n+1,\ Yn,n+1)$$

where, $K2=((Xn-Xn-1)^2+(Xn-Yn-1)^2)^{1/2}/(2((Xn+1-Xn)^2+(Yn+1-Yn)^2)^{1/2})$

The positional data of the mid-point-same-distance-point Pn,n+1 calculated by the mid-point-same-distance-point calculator 31f are sent to the radius calculator 31g.

Figure 4:
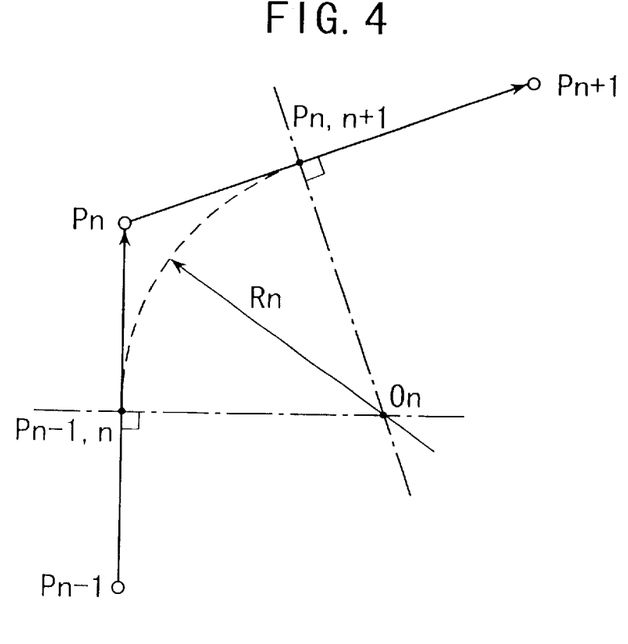
FIG. 4 is an illustration showing how to determine radius of curvature.

According to the positional data of the mid-point Pn−1,n inputted from the mid point calculator 31e and the positional data of a mid-point-same-distance-point Pn,n+1 calculated by the mid-point-same-distance-point calculator 31f, the radius calculator 31g, as shown in FIG. 4, determines a center "On" of the emerging curve on the road by creating a crossing point of a line that lies at a right angle to the shorter straight line (here, Pn−1 Pn) at the mid-point Pn−1,n and a line that lies at a right angle to the longer straight line (here, Pn Pn+1) at the mid-point-same-distance-point Pn,n+1. Then, the radius calculator 31g calculates a radius of curvature Rn of the curve based on the determined center "On". The calculation results are sent to the corrector 31h.

Specifically:

$$On=Pn-1,n+Pn-1,n\ On=(Xn-1,n,\ Yn-1,n)+M(Yn-Yn-1,Xn-1-Xn) \quad (1)$$

$$On=Pn,n+1+Pn,n+1\ On=(Xn,n+1,\ Yn,n+1)+N(Yn+1-Yn,\ Xn-Xn+1) \quad (2)$$

Therefore, $$Xn-1,n+M(Yn-Yn-1)=Xn,n+1+N(Yn+1-Yn) \quad (3)$$

$$Yn-1,n+M(Xn-1-Xn)=Yn,n+1+N(Xn-Xn+1) \quad (4)$$

Elimination of M from both formulas (3) and (4) can obtain N as shown below:

$$N=((Xn-1-Xn)(Xn-1,n-Xn,n+1)+(Yn-1-Yn)(Yn-1,n-Yn,n+1))/(Xn-1\cdot Yn+1-Xn+1\cdot Yn-1-Xn-1\cdot Yn+Xn\cdot Yn-1-Xn\cdot Yn+1+Xn+1\cdot Yn) \quad (5)$$

Position "On" of curve center is:

$$On=(Xon,Yon)=(Xn,n+1+N\cdot Yn+1-N\cdot Yn,\ Yn,n+1+N\cdot Xn-N\cdot Xn+1) \quad (6)$$

Therefore, the radius of curvature Rn is obtained from the following formula:

$$Rn=((Xn-Xn-1)(Yn+1-Yn)-(Xn+1-Xn)(Yn-Yn-1))/|((Xn-Xn-1)(Yn+1-Yn)-(Xn+1-Xn)(Yn-Yn-1))|\cdot((Xon-Xn-1,n)^2+(Yon-Yn-1,n)^2)^{1/2} \quad (7)$$

Here, a positive figure of radius of curvature Rn means a left turn and a negative figure means a right turn.

The distance Lon from the curve center On to the curve representative node, i.e., the $2^{nd}$(second) node Pn, is obtained from the following formula (8):

$$Lon=((Xon-Xn)^2+(Yon-Yn)^2)^{1/2} \quad (8)$$

The corrector 31h calculates a difference Deln between the radius of curvature Rn obtained by the radius calculator 31g and the distance Lon from the curve center On to the $2^{nd}$ (second) node Pn. When the difference Deln exceeds a given error value (to be mentioned later), the corrector 31h corrects the radius of curvature Rn so that the difference Deln be within the given error value. The given error value varies according to road width data from the navigator 17 (a road width D) and a shorter straight line distance judged by the relative length judgment 31d, the given error value being represented as αD. α is a constant to be set in accordance with the shorter straight line distance, and is hereinafter referred to as a node interval correction factor. When the road width D is wider, the given error value is larger, resulting in less possibility of correction. That is to represent a reality that when a road width is wider, its radius of curvature is larger.

As with the node interval correction factor α, when the shorter straight line distance is shorter, the node interval correction factor α is larger, resulting in less possibility of correction. For example, when the shorter straight line distance is shorter than 20 m, α is 1.2, when the shorter straight line distance is greater than 20 m and shorter than 100 m, α is 0.6, and when the shorter straight line distance is longer than 100 m, α is 0.3. Short intervals of nodes represent that the road is accurately drawn by nodes on the map, i.e., less correction is necessary.

Figure 5:
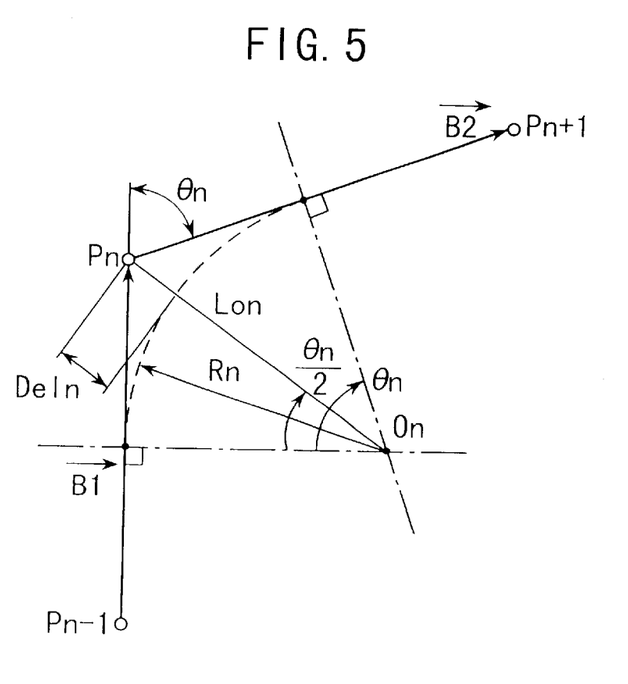
FIG. 5 is an illustration showing how to correct the obtained radius of curvature.

FIG. 5 shows a detailed correction to be made by the corrector 31h. A vector from Pn−1 to Pn is denoted by B1, and a vector from Pn to Pn+1 is denoted by B2.

$$B1=(Xn-Xn-1,\ Yn-Yn-1)=(Xb1,\ Yb1),$$

$$B2=(Xn+1-Xn,\ Yn+1-Yn)=(Xb2,\ Yb2)$$

An angle θn formed by B1 and B2 is as follows:

$$\cos\theta n=(Xb1\cdot Xb2+Yb1+Yb2)/(|B1|\cdot |B2|)$$

An error (ratio) Pdeln between Lon and Rn is as follows:

$$Pdeln=Rn/Lon=\cos(\theta n/2)=((\cos\theta n+1)/2)^{1/2} \quad (9)$$

Therefore, the difference Deln between Lon and Rn is as follows:

$$Deln=Lon-|Rn|=Lon\cdot(1-Pdeln)=Lon(1-(\cos\theta n+1)/2)^{1/2}) \quad (10)$$

In this connection, when the difference Deln exceeds the given error value (αD), the radius of curvature Rn is corrected so that Deln becomes equal to αD.

Specifically:

$$Lon=Deln/(1-((\cos\theta n+1)/2)^{1/2})=\alpha D/(1-((\cos\theta n+1)/2)^{1/2})=$$

$$\alpha D/(1-((Xb1\cdot Xb2+Yb1\cdot Yb2+|B1|\cdot |B2|)/(2|B1|\cdot |B2|))^{1/2})Rn=$$

$$Lon\cdot Pdeln=\alpha D/(1-((\cos\theta n+1)/2)^{1/2})\cdot((\cos\theta n+1)/2)^{1/2}=\alpha D/((2/(\cos\theta n+1))^{1/2}-1)=$$

$$\alpha D/((2|B1ve|\cdot |B2ve|/(Xb1\cdot Xb2+Yb1\cdot Yb2+|B1ve|\cdot |B2ve|))^{1/2}-1) \quad (11)$$

Based on the radius of curvature Rn, having been corrected by the corrector 31h, or not corrected, depending on whether the difference Deln is smaller than the given error value, the road data calculator 31 calculates curvature RRn (=1/Rn) of the curve, stores RRn together with other data and transmits respective data as required.

Because the road data calculator 31 obtains the radius of curvature Rn as described above, data of nodes with irregular intervals, as inputted from the navigator 17, can be used as they are. Thus the radius of curvature of the road can be determined quickly and accurately by simple calculation without data supplement or complex calculations. The continuity of radiuses of curvature determined for respective nodes are natural and the obtained data represent accurately the actual road geometry. Further, when possible calculation errors occur, the calculated radius of curvature Rn always becomes smaller than the actual radius of curvature. This is preferable for a warning deceleration control when approaching a curve to make certain a proper warning is given.

With the provision of the corrector 31h for correcting the radius of curvature Rn, it is possible to calculate the radius of curvature Rn accurately. Furthermore, with the provision to make the given error value changeable depending on the actual road widths and node intervals, more accurate calculations can be done. In other words, in order to represent a reality that when a road width is wider, its radius of curvature is larger, it is set so that when road width D is wider, the given error value is larger, resulting in less possibility of correction. In order to reflect the fact that short intervals of nodes represent that the road is accurately drawn by nodes on the map, it is set so that when the shorter straight line distance is shorter, the node interval correction factor a is larger, resulting in less possibility of correction.

Final road data of a curve memorized in the road data calculator 31 may be those which are further reduced, for example, neighboring small curves are treated as one large curve, or those which are processed by comparing with other road data obtained from other road data detecting means, e.g., a device which obtains road data by processing pictures taken by CCD camera.

The vehicle speed calculator 32, composing a running condition detecting means, receives respective wheel speeds from the wheel speed sensors 18fl, 18fr, 18rl and 18rr so that vehicle speed V is calculated by a predetermined formula, e.g., an average of the four wheel speeds. Vehicle speed V is sent to the road friction estimator 33, the road slope calculator 34 and the required deceleration calculator 42.

The road friction estimator 33, which estimates the road surface friction coefficient $\mu$ by calculation, e.g., an estimating method disclosed by the inventor in Japanese Patent Laid-open No. 2274/1996, receives steering wheel angle, yaw rate and vehicle speed V from the steering wheel angle sensor 19, the yaw rate sensor 20 and the vehicle speed calculator 32, respectively.

The road friction estimator 33, composing also a running condition detecting means, estimates the road surface friction coefficient $\mu$ by calculation based on steering wheel angle, yaw rate and vehicle speed V, and sends a road surface friction coefficient $\mu$ to the standard deceleration calculator 35, the permissible acceleration calculator 38 and the permissible deceleration calculator 40. The estimate is made as follows: firstly calculating actual cornering power of front and rear wheels of the vehicle based on steering wheel angle, yaw rate and vehicle speed V by solving the equation of motion of the vehicle lateral movement; secondly calculating theoretically maximum cornering power on high $\mu$ ($\mu$=1.0); finally estimating the road surface friction coefficient $\mu$ from the ratio of the actual cornering power and the theoretically maximum cornering power.

The road slope calculator 34, composing also a running condition detecting means, calculates road slope SL from data of longitudinal acceleration Gx and vehicle speed V inputted from the longitudinal acceleration sensor 21 and the vehicle speed calculator 32, respectively, and sends the road slope SL to the standard deceleration calculator 35. Calculation of road slope SL is carried out by the following formula (12):

$$SL=(Gx-\text{ratio of vehicle speed change}/g)/100 \tag{12}$$

SL(%): Positive figure means up-hill slope

Gx(m/S$^2$): longitudinal acceleration g(m/S$^2$): gravitational acceleration.

Road slope SL may be calculated from engine torque (N–m), torque ratio of the torque converter, transmission gear ratio, final gear ratio, tire diameter (m), running resistance (N), vehicle mass (kg), ratio of change of vehicle speed (m/S$^2$), and gravitational acceleration g (m/S$^2$), as shown in the following formula (12)':

$$SL=\tan(\sin^{-1}((((\text{engine torque}\times\text{torque ratio of torque converter}\times\\ \text{transmission gear ratio}\times\text{final gear ratio}/\text{tire}\\ \text{radius})-\text{running resistance})/\text{vehicle mass}-\text{ratio of change of}\\ \text{vehicle speed})/g))\times100\approx\\ ((((\text{engine torque}\times\text{torque ratio of torque converter}\times\text{transmission}\\ \text{gear ratio}\times\text{final gear ratio}/\text{tire radius})-\text{running}\\ \text{resistance})/\text{vehicle mass}-\text{ratio of change of vehicle speed}/g))\\ \times100 \tag{12}'$$

Besides formulas (12) and (12)', road slope SL may be calculated by any other way, e.g., utilizing altitude data available from a navigator installed on the vehicle or road geometry data from picture data provided by a CCD camera.

The standard deceleration calculator 35 calculates a standard deceleration DXL3, based on the present running conditions at the point of operation, which includes the road surface friction coefficient $\mu$ and road slope SL inputted from the road friction estimator 33 and the road slope calculator 34 respectively, and based on estimated running conditions in a curve. The standard deceleration DXL3 is transmitted to the warning deceleration calculator 36 and the forced deceleration calculator 37.

An explanation on how to calculate DXL3 (m/S$^2$) will follow. Firstly, a basic standard deceleration DXL1 (m/S$^2$) is calculated by the following formula (13) from the road surface friction coefficient $\mu$, gravitational acceleration g (m/S$^2$) and K4 (e.g., 0.65), which is provided considering an estimated tolerance of $\mu$, brake effectiveness on the road surface and safety factors.

$$DXL1=\mu g\, K4 \tag{13}$$

Comparing DXL1 with K5, which is predetermined considering maximal deceleration in ordinary driving, for example 5.0 m/s$^2$ (not an excessive deceleration), the smaller of the two is chosen as DXL2. By doing this, limitation is introduced. Further correcting DXL2 to reflect road slope SL, a standard deceleration DXL3 is calculated by the following formula (14):

$$DXL3=DXL2+(SL/100)g \tag{14}$$

In order for the driver to feel similar deceleration, corrections to DXL2 are made. Specifically, DXL2 is made larger when deceleration occurs at an up-hill slope, and it is made smaller when deceleration occurs at a down-hill slope, resulting in the outcome that gravitational deceleration is considered at up-hill slopes and gravitational acceleration is considered at down-hill slopes.

The warning deceleration calculator 36 receives a standard deceleration DXL3 from the standard deceleration calculator 35 and determines a warning control threshold, namely a warning deceleration WDX (m/s$^2$), and determines where to set a warning level, i.e., a warning dispatches when needed deceleration to prevent an over speed condition in a curve exceeds a certain level compared against DXL3. In this embodiment, the warning control threshold is 50% of the standard deceleration DXL3.

$$WDX=0.5DXL3 \tag{15}$$

Warning deceleration WDX is sent to the equivalent linear distance calculator 41, the passing judgement 43 and the warning deceleration controller 44.

The forced deceleration calculator 37 receives a standard deceleration DXL3 from the standard deceleration calculator 35 and calculates a forced control threshold, namely a forced deceleration CDX (m/s$^2$), and determines where to set a forced control level, i.e., forced deceleration is carried out when needed deceleration to prevent an over speed condition in a curve exceeds a certain level compared against DXL3. In this embodiment, the forced control threshold is 80% of the standard deceleration DXL3.

$$CDX=0.8DXL3 \tag{16}$$

Forced deceleration CDX is sent to the passing judgement 43 and the warning deceleration controller 44.

The permissible lateral acceleration calculator 38 receives the road surface friction coefficient $\mu$ from the road friction estimator 33 and calculates a permissible lateral acceleration AYL (m/s$^2$) by the following formula (17) based on the road surface friction coefficient $\mu$:

$$AYL=K6\mu g \tag{17}$$

K6 is a predetermined value considering estimation tolerance of $\mu$ and tolerance of deceleration, K6 being 0.5 in this embodiment. Permissible lateral acceleration AYL is sent to the permissible access speed calculator 39.

The permissible access speed calculator 39 receives curvature RRn of the objective curve from the road data calculator 31 and permissible lateral acceleration AYL from the permissible lateral acceleration calculator 38. The calculator 39 calculates, e.g., by the following formula (18), a permissible access speed VAP (m/s) for passing through a curve with curvature RRn:

$$VAP=(AYL/RRn)^{1/2} \tag{18}$$

Permissible lateral acceleration AYL is sent to the required deceleration calculator 42. Thus, the permissible lateral acceleration calculator 38 and the permissible access speed calculator 39 are provided to calculate permissible access speed VAP which composes permissible running conditions for passing through a curve.

The permissible deceleration calculator 40 receives the road surface friction coefficient $\mu$ from the road friction estimator 33 and calculates a permissible deceleration AXL (m/s$^2$) in a curve by the following formula (20), referring to the friction circle concept expressed in equation (19):

$$AYL^2+AXL^2=(\mu g) \tag{19}$$

$$AXL=\mu g\,(1-K6^2)^{1/2} \tag{20}$$

Permissible deceleration AXL is sent to the equivalent linear distance calculator 41.

The equivalent linear distance calculator 41 receives curvature RRn of the curve (including any winding part of the road to the objective curve), curve depth THn and link length Lssn from the vehicle position to an objective curve from the road data calculator 31. The equivalent linear distance calculator 41 also receives warning deceleration WDX from the warning deceleration calculator 36. The equivalent linear distance calculator 41 calculates an equivalent linear distance ELL by the following formula (21), separating the road into a straight part and a winding part and counting the winding part to be converted into an equivalent straight length:

Equivalent linear distance ELL=Length of the straight part+ Equivalent straight length of the winding part=Link length Lssn−length AL of an arc approximating the winding part+AL
$$K7\,Lssn-AL(1-K7) \tag{21}$$

The length of an arc approximating the winding part is calculated by summation of each arc length ALn, which represents each bend of the winding part in the course to the objective curve. ALn is calculated by the following formula (22), counting road data of each bend, i.e., curvature RRn and curve depth THn:

$$ALn=THn/RRn \tag{22}$$

The factor K7 is calculated by the following formula (23) from the permissible deceleration AXL and the warning deceleration WDX:

$$K7=AXL/WDX \text{ and } K7\leq 1 \tag{23}$$

It is obviously understood from formulas (22) and (23) that a bend where permissible deceleration is limited to ½ is converted to a straight line with ½ length of the arc of the bend.

Thus, the equivalent linear distance calculator 41 is to provide a worth judging equivalent linear distance by correcting actual distance from the point of operation (present position) to an objective curve (curve on the road in front of the vehicle) based on road data. The correction converts the actual length of the winding part of the road into shorter equivalent linear distance according to curvature of the winding part.

As an equivalent linear distance is determined by consideration of permissible decelerations at respective bends of the winding part of a, road to an objective curve, passing judgement for each of various curves can be done simply with equivalent linear distance so that control preciseness can be upgraded with minimal calculations.

In the course of calculating an equivalent linear distance ELL by the equivalent linear distance calculator 41, used as a variable is the permissible deceleration AXL calculated by the permissible deceleration calculator 40 from the road surface friction coefficient $\mu$ using the friction circle concept. Thus, reflected accurately in the calculation is the naturally incurred limitation of applicable deceleration while lateral acceleration occurs at the same time, due to the relation of lateral and longitudinal accelerations, so that reliable control can be carried out.

The required deceleration calculator 42 receives vehicle speed V, permissible access speed VAP and equivalent linear distance ELL from the vehicle speed calculator 32, the permissible access speed calculator 39 and the equivalent linear distance calculator 41 respectively, and then calculates a required deceleration RDX by the following formula (24). RDX is required deceleration until reaching an objective curve for entering into the curve with the permissible access speed VAP.

$$RDX=(V^2-VAP^2)/(2ELL) \tag{24}$$

Required deceleration RDX is sent to the passing judgement 43 and the warning deceleration control 44.

The passing judgement 43 receives warning deceleration WDX, forced deceleration CDX and required deceleration RDX from the warning deceleration calculator 36, the forced deceleration calculator 37 and the required deceleration calculator 42 respectively, and then makes judgements on whether or not forced deceleration control is needed to achieve the required deceleration RDX (RDX≧CDX), whether or not the situation is at a level where forced deceleration control is not necessary but warning is required (CDX>RDX≧WDX), or whether it is possible to pass without warning or forced deceleration control. The result of the judgement is sent to the warning deceleration control 44.

Namely the warning deceleration calculator 36, the forced deceleration calculator 37, the required deceleration calculator 42 and the passing judgement 43 compose passing judgement means for judging the possibility of passing through an objective curve according to the equivalent linear distance ELL (worth judging distance), the standard deceleration DXL3 (estimated running condition) and the permissible access speed VAP (permissible running condition).

The warning deceleration controller 44, composing the warning and deceleration controlling means, receives master cylinder pressure, turn signal switch information, warning deceleration WDX, forced deceleration CDX, required deceleration RDX and the result of judgement from the master cylinder pressure sensor 22, the turn signal switch 23, the warning deceleration calculator 36, the forced deceleration calculator 37, the required deceleration calculator 42 and the passing judgement 43, respectively.

At every result of judgement, the warning deceleration controller 44 carries out control after confirming the driver's decelerating operation and the driver's intention to turn before is entering into the curve. When forced deceleration control is required, the controller 44 determines an aimed deceleration SDX and carries out deceleration control to achieve the aimed deceleration SDX. Alternatively, when warning is necessary, the controller 44 carries out a warning control.

When the passing judgement 43 judges that forced control is required (RDX≧CDX), the controller 44 calculates a deceleration PDX by the driver's operation based on the master cylinder pressure. If PDX is larger than the required deceleration CDX, i.e., the driver's decelerating operation is effective enough, the controller 44 alters the forced deceleration control to warning control.

If the turning switch 23 is ON even though the driver's decelerating operation is not effective, the controller 44 judges that the driver has no intention to enter the curve and cancels both warning and forced deceleration controls.

If the case is not the above, namely the driver neither carries out a decelerating operation nor has the intention to turn before the curve, i.e., the vehicle is going into the objective curve, the controller 44 carries out forced deceleration control.

In the forced deceleration control, firstly an aimed deceleration SDX is determined from the required deceleration RDX with limitation, e.g., by selecting the smaller of the RDX and 5.0 (m/s$^2$). In order to achieve the aimed deceleration SDX, the necessary controls are carried out selectively out of the following potential controls: fuel cut and throttle closing controls (to be sent to the engine control unit 24); fuel cut, throttle closing and shift down (to be sent to the engine control unit 24 and the transmission control unit 25); fuel cut, throttle closing and braking (to be sent to the engine control unit 24 and the brake control unit 26); and fuel cut, throttle closing, shift down and braking (to be sent to the engine control unit 24, the transmission control unit 25 and the brake control unit 26).

When the passing judgement 43 judges that the situation is at a warning level (CDX>RDX≧WDX), or that the situation has changed to a warning level from a forced deceleration level, deceleration PDX from the driver's decelerating operation is calculated from the master cylinder pressure. If the deceleration PDX is larger than the warning deceleration WDX, i.e., the driver's decelerating operation is effective enough, warning is not carried out.

If the turning swItch 23 is ON even though the deceleration PDX by the driver's decelerating operation is smaller than or equal to the warning deceleration WDX, the controller 44 judges that the driver has no intention to enter the curve and cancels the warning control.

If the case is not the above, namely the driver neither carries out a decelerating operation nor has an intention to turn before the curve, i.e., the vehicle is going into the objective curve, the controller carries out a warning by the display 27 or the loudspeaker 28.

Figure 7:
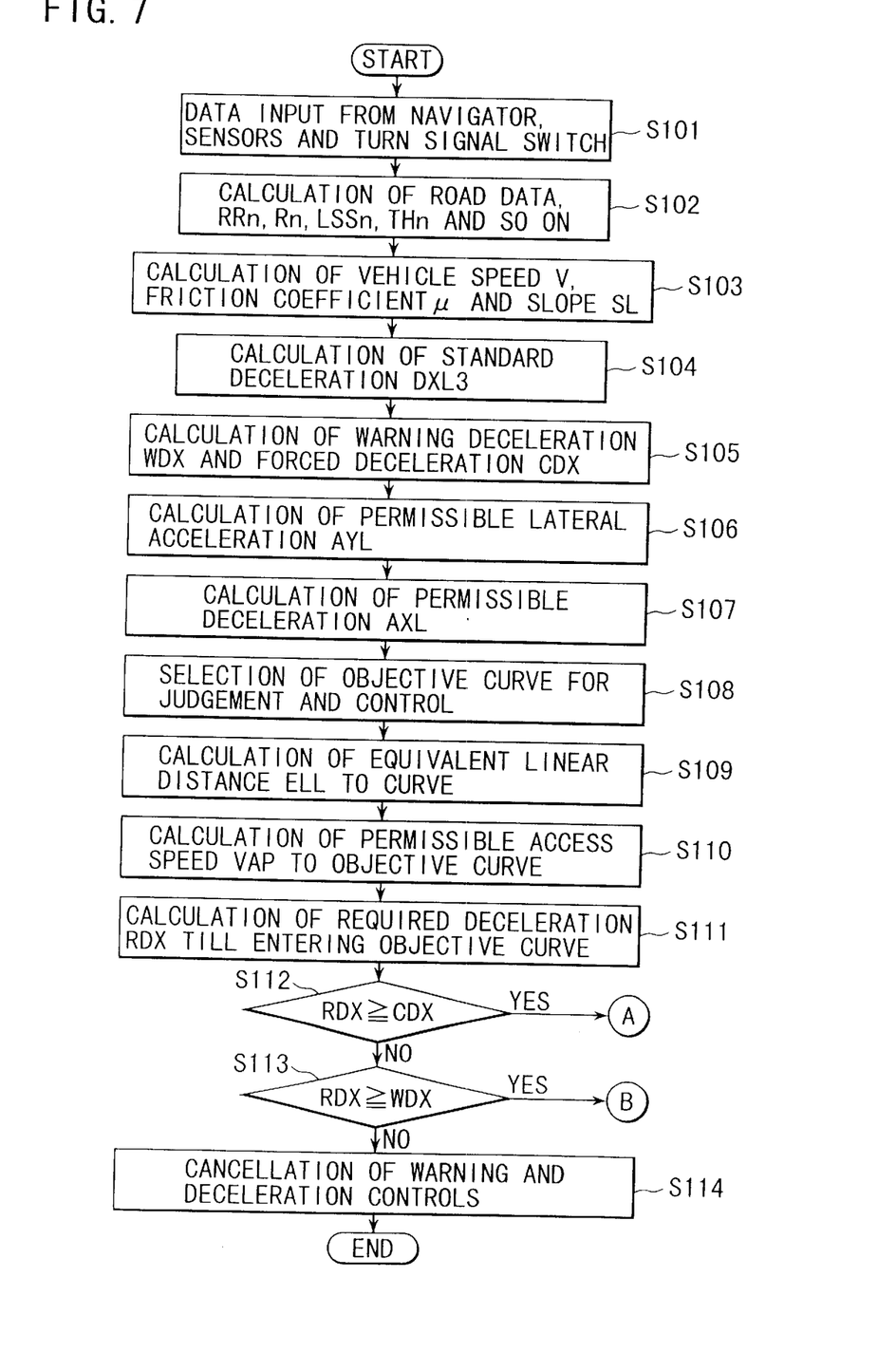
FIG. 7 is a flow chart showing vehicle dynamic control.
Figure 8:
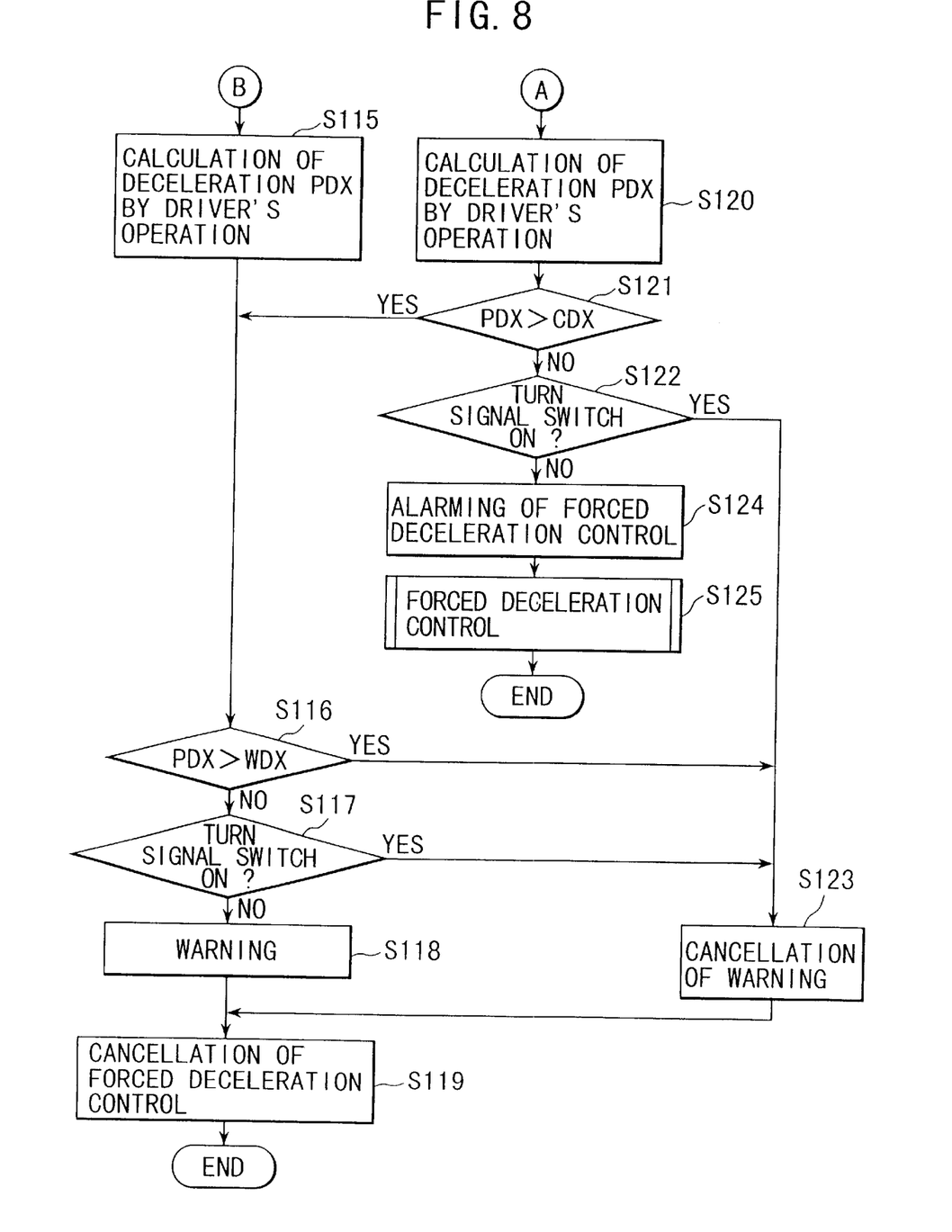
FIG. 8 is a flow chart continued from FIG. 7.
Figure 9:
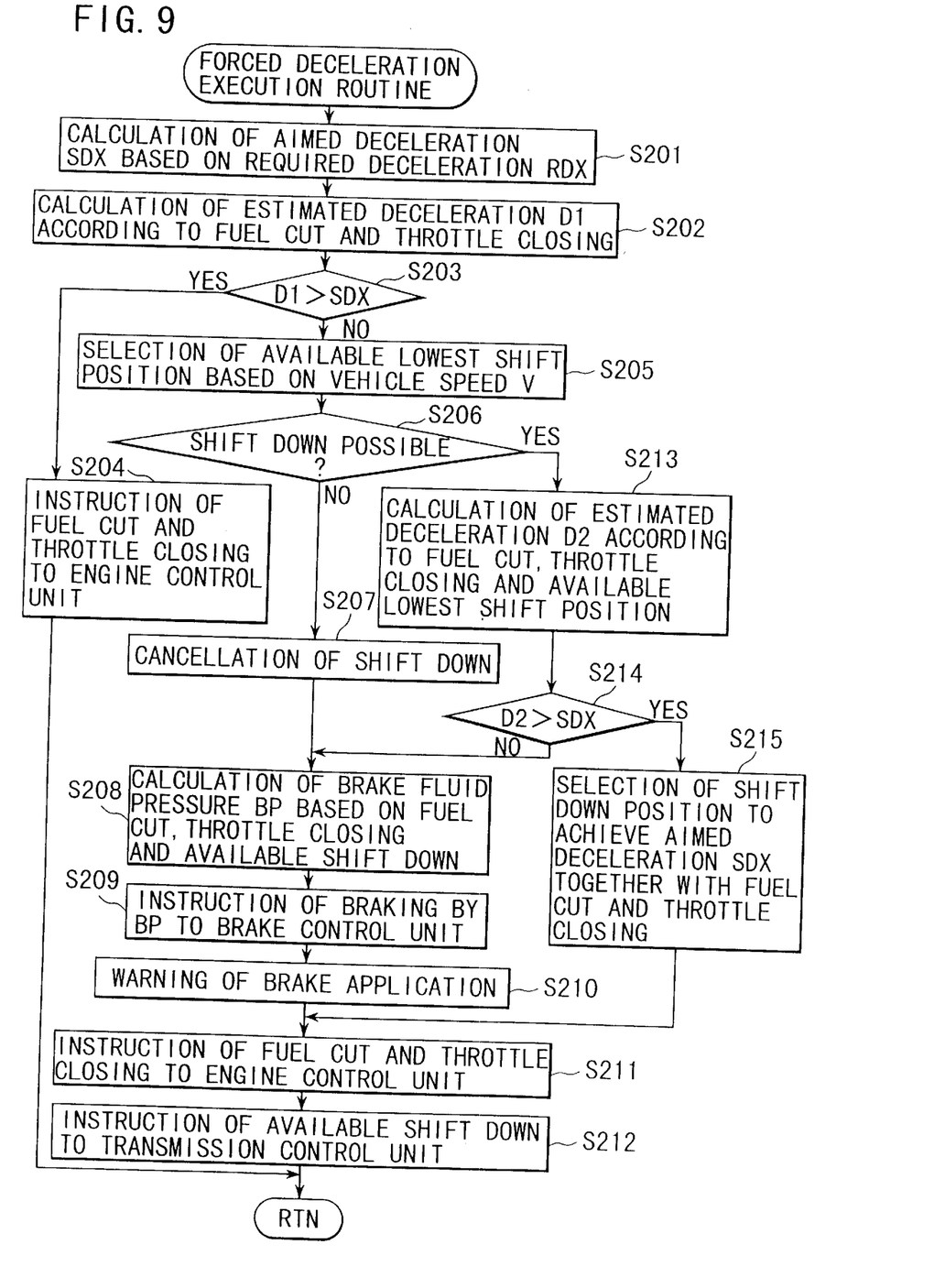
FIG. 9 is a flow chart showing an execution routine of forced deceleration control.

The operations described above are explained referring to the flow charts shown in FIG. 7, FIG. 8 and FIG. 9. FIG. 7 and FIG. 8 show flow charts of vehicle dynamic control carried out by the controller 30. When this control program starts, the program goes to S101 (S means step) where the controller 30 receives data and signals from the respective device, switch and sensors as shown below:

Node data, vehicle position, road width data from the navigator 17

Respective wheel speeds from the wheel speed sensors 18$fl$, 18$fr$, 18$rl$ and 18$rr$ Steering wheel angle from the steering wheel angle sensor 19

Yaw rate from the yaw rate sensor 20

Longitudinal acceleration Gx from the longitudinal acceleration sensor 21

Master cylinder pressure from the master cylinder pressure sensor 22

ON-OFF status of the turn signal from the turn signal switch 23

The program goes to S102, where the road data calculator 31 calculates road geometry data of the approaching road within a predetermined range, e.g., 300 m, based on inputted data from the navigator 17.

The road geometry data include: position (Xn, Yn) of a representative node Pn; a distance Ln between node Pn−1 and node Pn; final radius of curvature Rn; curvature RRn (=1/Rn); curve depth THn; curve center On; curve angle θn at each representative node; distance between curve starting point Lsn and node Pn−1; and distance Lssn from the vehicle position to the curve (link length).

The program goes to S103, where the vehicle speed calculator 32 calculates a vehicle speed V based on the 4 (four) wheel speeds, the road friction estimator 33 estimates a road surface friction coefficient $\mu$ based on the steering wheel angle, the yaw rate and the vehicle speed V, and the road slope calculator 34 calculates road slope SL by formula (12) based on the vehicle speed V and the longitudinal acceleration Gx. Then the program goes to S104.

At S104, the standard deceleration calculator 35 calculates a standard deceleration DXL3 by formulas (13) and (14) based on the road surface friction coefficient $\mu$ and the road slope SL.

Then the program goes to S105, where the warning deceleration calculator 36 calculates a warning deceleration WDX by formula (15) based on the standard deceleration DXL3, and the forced deceleration calculator 37 calculates a forced deceleration CDX by formula (16) based on the standard deceleration DXL3.

Then the program goes to S106, where the permissible lateral acceleration calculator 38 calculates a permissible lateral acceleration AYL by formula (17) based on the road surface friction coefficient $\mu$.

Then the program goes to S107, where the permissible deceleration calculator 40 calculates a permissible deceleration AXL by formula (20) based on the road surface friction coefficient $\mu$, referring to a relation to the permissible lateral acceleration AYL calculated at S106, namely the friction circle relation.

Then the program goes to S108, where the road data calculator 31 selects the curve which is the objective for judgement of the possibility of passing through and control, and the road data of the curve is outputted. Then the program goes to S109.

At S109, the equivalent linear distance calculator 41 calculates an equivalent linear distance ELL by formula (21) based on the curvature RRn of the curve (inclusive of bends in the winding part of the road approaching the curve), the curve depth THn, the link length Lssn, the permissible deceleration AXL and the warning deceleration WDX.

Then the program goes to S110, where the permissible access speed calculator 39 calculates a permissible access speed VAP by formula (18) based on the curvature RRn of the objective curve and the permissible lateral acceleration AYL.

Then the program goes to S111, where the required deceleration calculator 42 calculates a required deceleration RDX for entering the objective curve by formula (24) based on the vehicle speed V, the equivalent linear distance ELL and the permissible access speed VAP.

Then the program goes to S112, where the passing judgement 43 compares the required deceleration RDX and the forced deceleration CDX. When RDX is larger than or equal to CDX (RDX$\geq$CDX), it is judged that forced deceleration is necessary, and the program goes to S120. When RDX is smaller than CDX (RDX<CDX), the program goes to S113.

At S113, as a result of the judgement at S112 that it is not a situation requiring forced deceleration, the passing judgement 43 compares the required deceleration RDX and the warning deceleration WDX. When RDX is larger than or equal to WDX (RDX$\geq$WDX), it is judged that a warning is necessary, and the program goes to S115. When RDX is smaller than WDX (RDX<WDX), the program goes to S114.

At S114, as a result of the judgement that a warning level was not measured at S113, the warning deceleration controller 44 cancels both warning and deceleration controls and the program stops.

At S115, as a result of the judgement of a warning level at S113, a deceleration PDX is calculated based on the master cylinder pressure resulting from the driver's operation of the brakes. Then the program goes to S116, where PDX is compared with the warning deceleration WDX.

When PDX is larger than WDX, namely when the driver carries out a decelerating operation more than that required, the program goes to S123 where the warning is canceled. Then the program goes to S119 where forced deceleration control is canceled and the program stops.

When PDX is smaller than or equal to WDX, the program goes to S117 where it is judged whether the turn signal switch 23 is ON or OFF.

When the judgement at S117 is ON, it is further judged that the driver has no intention to go into the objective curve. Then the program goes to S123, where the warning is canceled, and then to S119 where forced deceleration control is canceled. Then the program stops.

When the judgement at S117 is OFF, it is further judged that the vehicle will go on into the objective curve with the present running conditions. Then the program goes to S118 where a warning is provided on the display 27 or by the loudspeaker 28 to inform the driver of an over speed condition. The program then goes to S119 where forced deceleration control is canceled (because the over speed condition is not so serious as to carry out forced deceleration control), and the program stops.

When it is judged that the present situation is at a level requiring forced deceleration control at S112, the program goes to S120 where a deceleration PDX is calculated based on the master cylinder pressure resulting from the driver's operation. Then the program goes to S121 where PDX is compared with the forced deceleration CDX.

When PDX is larger than CDX in the comparison at S121, namely when the driver carries out a deceleration operation more than that required, the program goes to S116, changing the forced control to a warning level as a result of a judgement that forced deceleration control is not necessary.

When PDX is smaller than or equal to CDX in the comparison at S121, the program goes to S122 where it is judged whether the turn signal switch 23 is ON or OFF.

When the judgement at S122 is ON, it is further judged that the driver has no intention to enter the objective curve. Then the program goes to S123, where the warning is canceled, and then the program goes on to S119 where forced deceleration control is canceled. Then the program stops.

When the judgement at S122 is OFF, it is further judged that the vehicle will proceed to the objective curve with the present running conditions. Then the program goes to S124 where an alarm is activated using the display 27 or the loudspeaker 28 to inform that forced deceleration control will be carried out. The program then goes to S125 where a forced deceleration control to be mentioned later is carried out, and the program stops.

Controls at the steps after S114 are carried out by the warning deceleration controller 44.

According to the embodiment of the present invention, the path to the objective curve is processed in a form of the equivalent linear distance considering permissible decelerations at a winding part of the path referring to the concept of a friction circle. Thus, by doing minimal calculations, it is possible to improve the judgement accuracy of an over speed condition which has to be actually controlled.

FIG. 9 shows a flow chart of a routine for forced deceleration control at S125 carried out by the warning deceleration controller 44.

Firstly at S201, an aimed deceleration SDX is determined by adding some limitation to the required deceleration RDX, for example, the smaller of the required deceleration RDX and 5.0 (m/s$^2$) is taken as the aimed deceleration SDX. Then the program goes to S202 where an estimated deceleration D1 is calculated, supposing that the engine control unit 24 is instructed to carry out fuel cut and completely close throttle.

Then the program goes to S203 where the estimated deceleration D1 and the aimed deceleration SDX are compared. When D1 is larger than SDX (D1>SDX), namely the aimed deceleration SDX is achievable by fuel cut and closing of the throttle, the program goes to S204 where the engine control unit 24 is instructed to carry out fuel cut and close the throttle. The program then goes out of the routine.

When the estimated deceleration D1 is smaller than or equal to the aimed deceleration SDX in the comparison at S203, namely the aimed deceleration SDX is not achievable by fuel cut and closing the throttle, the program goes to S205.

At S205, the lowest down shift (gear ratio) so that the engine does not over rev is selected, based on the vehicle speed V.

Then the program goes to S206 where it is judged whether it is possible to shift down or not from the present shift position.

When it is judged that shift down is not possible at S206, the program goes to S207 where shift down is canceled. Then the program goes to S208 where a required brake fluid pressure BP for braking is calculated in addition to fuel cut, closing of the throttle and available transmission shift down, in order to achieve the aimed deceleration SDX.

The program then goes to S209 where the brake control unit 26 is instructed to apply the brake pressure BP, and then the program goes to S210. At S210, the display 27 or the loudspeaker 28 informs the driver that the brake control unit 26 carried out braking, and then the program goes to S211 where the engine control unit 24 is instructed to carry out fuel cut and completely close the throttle. The program then goes to S212 where the transmission control unit 25 is instructed to carry out available shift down and then goes out of the routine.

When it is judged that shift down is possible at S206, the program goes to S213 where an estimated deceleration D2 is calculated, supposing that fuel cut, complete closing of the throttle and transmission shift down to the available lowest shift position (gear ratio) are carried out.

At S214, the estimated deceleration D2 and the aimed deceleration SDX are compared. When D2 is larger than SDX (D2>SDX), namely the aimed deceleration is achievable by fuel cut, closing of the throttle and transmission shift down, the program goes to S215 where a shift position is selected among the available shift positions for down shift in order to achieve the aimed deceleration CDX together with fuel cut and closing of the throttle. Then the program goes to S211 where the engine control unit 24 is instructed to carry out the fuel cut and close the throttle. Then the program goes to S212 where the transmission control unit 25 is instructed to carry out shift down, and then the program goes out of the routine.

When D2 is smaller than or equal to SDX at S214, the program goes to S208 where a required brake fluid pressure BP for braking is calculated in addition to fuel cut, closing of the throttle and available transmission shift down, in order to achieve the aimed deceleration SDX.

The program then goes to S209 where the brake control unit 26 is instructed to apply the brake pressure BP, and then the program goes to S210. At S210, the display 27 or the loudspeaker 28 informs the driver that the brake control unit 26 carried out braking, and then the program goes to S211 where the engine control unit 24 is instructed to carry out the fuel cut and completely close the throttle. The program then goes to S212 where the transmission control unit 25 is instructed to carry out the available shift down, and the program then goes out of the routine.

In this embodiment, the passing judgement means judges the possibility of a vehicle passing through a curve by comparison of a required deceleration and a warning deceleration or by comparison of a required deceleration and a forced deceleration, based on an equivalent linear distance as a worth judging distance, a standard deceleration as an estimated running condition, and a permissible access speed as a permissible running condition. It is possible to judge based on a combination of other running conditions, e.g., vehicle speed, deceleration, distance, time and lateral acceleration.

Also, it is possible to take, at judgement, comparison of items other than deceleration, for example distance, time, speed and lateral acceleration. In the event of taking distance, a judgement on the possibility of passing through a curve is made by comparing two distances, one of which is needed to decrease vehicle speed with the warning deceleration or the forced deceleration from the present speed to a permissible access speed and the other of which is from the present position to the curve.

Shown in this embodiment is deceleration control by the combination of an engine control unit, a transmission control unit and a brake control unit. Deceleration control may be carried out by one of the three control units or by a combination of two of the three.

In this embodiment, the engine control unit carries out fuel cut and throttle closing for forced deceleration. When an engine is a turbo charged one, decreasing the charged pressure can be used for forced deceleration control. Also, other engine controls, e.g., changes of fuel injection timing and ignition timing, can be used for forced deceleration control.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A vehicle dynamic control system, comprising:
running condition detecting means for detecting running conditions of a vehicle;
road data detecting means for detecting road data relating to a road in front of the vehicle;
permissible speed calculating means for calculating a permissible speed to pass through a curve based on said running conditions and said road data;
equivalent linear distance calculating means for calculating an equivalent linear distance as a distance for performing a decelerating operation by shortening a distance from a point of said decelerating operation to the curve in front of the vehicle based on a permissible deceleration at a winding pale and a curvature of the winding part between the point of said decelerating operation and the curve so as to consider said permissible deceleration applicable at winding part of the road;
passing judgement means for judging possibility of the vehicle passing through the curve by a parameter based on at least said equivalent linear distance and said permissible speed; and
warning and deceleration control means for activating at least one of warning means and decelerating means based on a judgement of said passing judgement means.

2. The vehicle dynamic control system according to claim 1, wherein:
said permissible deceleration is calculated by a friction circle relation between longitudinal and lateral accelerations of the vehicle.

3. The vehicle dynamic control system according to claim 1, wherein:
said passing judgment means judges the possibility of passing the curve based on the parameter in a predetermined manner, wherein said parameter is calculated as a required deceleration to be applied until reaching the curve based on a vehicle speed at the point of operation, said equivalent linear distance, and said permissible speed for passing through the curve.

4. A dynamic control system of a vehicle having an engine for providing power to drive the vehicle, a transmission directly and mechanically connected to said engine for changing a transmission ratio to an optimum value for driving said vehicle in any driving conditions, vehicle running condition detecting means mounted on said vehicle for detecting vehicle running conditions and for generating a vehicle running condition signal, and a navigation system mounted on said vehicle for deriving information relating to a road where said vehicle is presently running through a global positioning system and for outputting a road information signal, the system comprising:

road data detecting means responsive to said road information signal for detecting road data relating to said road in front of said vehicle and for producing a road data signal;

permissible speed calculating means responsive to said road data signal for calculating a permissible speed to pass through a curve based on said running conditions and said road data and for generating a permissible speed signal,     equivalent linear distance calculating means responsive to said road data signal and said permissible speed signal for calculating an equivalent linear distance for performing a decelerating operation by shortening a distance from a point of said decelerating operation to the curve in front of said vehicle based on a predetermined permissible deceleration at a winding part between a starting point of said decelerating operation and said curve so as to determine a permissible deceleration applicable at said winding part of the road and for producing a permissible deceleration signal;

passing judgement means responsive to said permissible deceleration signal for judging the possibility of said vehicle passing through said curve by parameters based on at least said equivalent linear distance and said permissible speed and for producing a passing judgement signal; and     warning and deceleration control means responsive to said passing judgement signal for activating at least one of a warning means and a decelerating means and so as to enable said vehicle to safely pass said curve at an optimum speed even if said road before entering said curve is curved.

5. A dynamic control method of a vehicle having an engine for providing power to drive the vehicle, a transmission directly and mechanically connected to said engine for changing a transmission ratio to an optimum value for driving said vehicle in any driving conditions, vehicle running condition detecting means mounted on said vehicle for detecting vehicle running conditions, and a navigation system mounted on said vehicle for deriving information relating to a road where said vehicle is presently running through a global positioning system, the method comprising:

detecting road data relating to said road in front of said vehicle through said navigation system;

calculating a permissible speed to pass through a curve based on said running conditions and said road data;

deriving an equivalent linear distance for performing a decelerating operation by shortening a distance from a point of said decelerating operation to the curve in front of said vehicle based on a predetermined permissible deceleration at a winding part between a starting point of said decelerating operation and said curve so as to determine a permissible deceleration applicable at said winding pair of the road;

judging the possibility of said vehicle passing through said curve by parameters based on at least said equivalent linear distance and said permissible speed; and     activating at least one of a warning means and a decelerating means so as to enable said vehicle to safely pass said curve at an optimum speed even if said road before entering said curve is curved.

\* \* \* \* \*